US009908257B2

(12) United States Patent
Eiswerth et al.

(10) Patent No.: US 9,908,257 B2
(45) Date of Patent: Mar. 6, 2018

(54) ADJUSTABLE FENCE ASSEMBLY FOR A MITER SAW

(71) Applicants: Robert Bosch Tool Corporation, Broadview, IL (US); Robert Bosch GmbH, Stuttgart (DE)

(72) Inventors: Patrick J. Eiswerth, Chicago, IL (US); Ivan Voukadinov, Prairie View, IL (US)

(73) Assignees: Robert Bosch Tool Corporation, Broadview, IL (US); Robert Bosch GmbH, Stuttgart, DE (US)

( * ) Notice: Subject to any disclaimer, the term of this patent is extended or adjusted under 35 U.S.C. 154(b) by 330 days.

(21) Appl. No.: 14/483,612

(22) Filed: Sep. 11, 2014

(65) Prior Publication Data
US 2016/0075050 A1   Mar. 17, 2016

(51) Int. Cl.
| | |
|---|---|
| B26D 7/02 | (2006.01) |
| B26D 1/14 | (2006.01) |
| B26D 1/18 | (2006.01) |
| B27B 27/04 | (2006.01) |
| B27B 3/28 | (2006.01) |
| B27B 27/06 | (2006.01) |
| B23D 45/02 | (2006.01) |
| B27B 27/00 | (2006.01) |

(52) U.S. Cl.
CPC ............ B27B 27/06 (2013.01); B23D 45/024 (2013.01); B27B 27/00 (2013.01)

(58) Field of Classification Search
CPC ........ B27B 27/06; B27B 27/00; B23D 45/024
USPC ..... 83/471.3, 473, 477.2, 471.1, 471.2, 397, 83/483–490, 581
See application file for complete search history.

(56) References Cited

U.S. PATENT DOCUMENTS

| 727,337 | A | * | 5/1903 | Forster | ................... | B23Q 3/005 |
|---|---|---|---|---|---|---|
| | | | | | | 144/253.2 |
| 3,289,301 | A | * | 12/1966 | Hanson | .................... | B25H 7/04 |
| | | | | | | 33/353 |

(Continued)

FOREIGN PATENT DOCUMENTS

GB    2208071 A    2/1989

OTHER PUBLICATIONS

International Search Report and Written Opinion corresponding to PCT Application No. PCT/EP2015/070276, dated Dec. 21, 2015 (12 pages).

*Primary Examiner* — Ghassem Alie
*Assistant Examiner* — Bharat C Patel
(74) *Attorney, Agent, or Firm* — Maginot Moore & Beck LLP (57) ABSTRACT

A fence system for a miter saw is configured to be adjusted along a horizontal axis while remaining aligned with the support table. The fence system includes a fence body defining first and second slots and an aperture, and a fixed base including first, second, and third bores. A first bushing extends through the first slot and includes a first opening, and a second bushing extends through the second slot and includes a second opening. A first fastener extends through the first opening into the first bore to clamp the first bushing to the fixed base, a second fastener extends through the second opening into the second bore to clamp the second bushing to the fixed base, and a third fastener extends through the opening into the third bore to releasably clamp the fence body to the fixed base.

20 Claims, 4 Drawing Sheets

(56) References Cited

U.S. PATENT DOCUMENTS

| | | | | |
|---|---|---|---|---|
| 3,623,754 A | * | 11/1971 | Moore | B60R 21/131 296/102 |
| 4,002,094 A | * | 1/1977 | Erickson | B23D 45/044 83/471.3 |
| 4,145,160 A | * | 3/1979 | Wiggins | B23B 47/288 408/103 |
| 4,324,057 A | * | 4/1982 | White | E02F 9/2841 299/109 |
| 4,464,962 A | | 8/1984 | Myhre | |
| 5,063,805 A | * | 11/1991 | Brundage | B23D 45/044 83/468.3 |
| 5,181,448 A | * | 1/1993 | Terpstra | B23D 45/044 83/468.3 |
| 5,293,801 A | | 3/1994 | Dritenbas | |
| 5,297,463 A | * | 3/1994 | O'Banion | B23D 45/044 83/397 |
| 5,401,135 A | * | 3/1995 | Stoen | B60P 1/44 414/546 |
| 5,755,148 A | * | 5/1998 | Stumpf | B27B 27/00 83/468.2 |
| 5,816,129 A | * | 10/1998 | Singer | B27B 27/06 83/468.3 |
| 5,855,366 A | * | 1/1999 | Chang | B27B 27/08 269/315 |
| 5,865,079 A | * | 2/1999 | Itzov | B23D 45/044 83/468.2 |
| 5,957,022 A | | 9/1999 | Stumpf et al. | |
| 6,021,700 A | * | 2/2000 | Garuglieri | B23D 59/002 83/13 |
| 6,073,529 A | * | 6/2000 | Shibata | B23D 45/044 83/468.5 |
| 6,102,519 A | * | 8/2000 | Yasui | B41J 19/207 347/37 |
| 6,360,798 B1 | * | 3/2002 | Apolinski | B23Q 3/069 144/135.2 |
| 6,520,225 B1 | * | 2/2003 | Dembicks | B27C 5/04 144/135.2 |
| 6,523,447 B2 | * | 2/2003 | Judge | B23D 45/024 83/471.3 |
| 6,899,005 B1 | * | 5/2005 | O'Banion | B23D 45/044 83/468.3 |
| 7,509,984 B2 | * | 3/2009 | Schwaiger | B24B 3/10 144/135.2 |
| 7,757,593 B2 | * | 7/2010 | Takase | B23D 45/044 83/471.1 |
| 8,495,939 B2 | * | 7/2013 | Kani | B27B 27/08 83/468.2 |
| 8,661,956 B2 | * | 3/2014 | Thomas | B23D 45/044 83/468.1 |
| 2002/0100350 A1 | * | 8/2002 | Brazell | B27B 27/08 83/438 |
| 2003/0228197 A1 | * | 12/2003 | Salvaryan | B23D 45/044 407/30 |
| 2004/0089125 A1 | | 3/2004 | Schoene et al. | |
| 2006/0005677 A1 | * | 1/2006 | Lambert | B27B 5/165 83/471.3 |
| 2006/0174739 A1 | * | 8/2006 | Chaikowsky | B23D 45/044 83/471.3 |
| 2006/0266190 A1 | * | 11/2006 | Saitou | B23D 45/044 83/581 |
| 2007/0221028 A1 | * | 9/2007 | Chen | B27B 27/00 83/467.1 |
| 2008/0053283 A1 | * | 3/2008 | Lin | B27B 27/04 83/440 |
| 2009/0095141 A1 | * | 4/2009 | Billings | B27B 27/06 83/468.3 |
| 2010/0018372 A1 | | 1/2010 | Thomas et al. | |
| 2012/0055308 A1 | * | 3/2012 | Ota | B27B 5/165 83/448 |
| 2012/0248675 A1 | * | 10/2012 | Harder | B23Q 16/001 269/315 |

\* cited by examiner

ADJUSTABLE FENCE ASSEMBLY FOR A MITER SAW

TECHNICAL FIELD

This disclosure relates generally to saw fences, and, more particularly, adjustable fences for miter saws.

BACKGROUND

A power miter saw is a cutting tool used to make crosscuts in a work piece, such as a piece of wood. Miter saws typically include a base equipped with a turntable and fence. The turntable is rotatable in relation to the base and has an upper surface that supports a work piece during cutting operations. The fence extends over the turntable to provide an abutment surface for locating an edge of the work piece at a predetermined position on the base.

The saw assembly of the miter saw includes a bevel arm, a cutting arm, and a cutting assembly. The bevel arm is pivotably attached to the turntable for pivotal movement about a bevel axis. The cutting arm is in turn pivotably attached to the bevel arm for pivotal movement toward and away from the turntable. The cutting arm supports the cutting assembly, comprising a circular saw blade and a motor, above the turntable. During cutting operations, the cutting arm is pivoted downwardly to bring the saw blade into contact with a work piece positioned on the turntable.

A typical miter saw includes a fence positioned adjacent the saw blade to serve as a stop for the workpiece. The miter saw generally includes a fence on each side of the saw blade to retain the workpiece in a fixed position as the saw blade cuts through the workpiece. Industry standards require that the clearance between the sides of the saw blade and the fence is less than 8 mm with the saw blade at zero degrees miter and bevel to ensure proper horizontal support for the workpiece. During a bevel or miter cut, however, the saw blade may be rotated to a position at which the fence can interfere with the cut. As a result, a portion of the fence must be moved so that the saw blade can be angled relative to the blade.

In typical miter saws, a one piece fence can be used. The one piece fence is fixed at a position such that it is less than 8 mm from the saw blade at all times. In order to perform a miter or bevel cut, the one piece fence must be removed from the saw so that the fence does not interfere with the saw blade during a cut. This generally requires additional effort of removing bolts from the fence to detach it, and then requiring the fence to be re-aligned upon reattachment. Furthermore, when the fence is removed, it no longer functions to provide horizontal support to the workpiece during a cut.

In other prior art miter saws, the fence includes two pieces. A lower piece is fixedly mounted to the saw frame and is configured such that it does not interfere with miter and bevel cuts. This lower piece, however, must be positioned more than 8 mm from the saw blade in order to avoid interference during miter and bevel cuts. An upper piece of the fence is positioned above the lower piece at a distance of 8 mm or less from the saw blade to provide the required horizontal support. The upper piece of the fence is configured to be moved or detached to avoid interference with the blade during a miter or bevel cut. Forming a fence of two separate pieces increases the cost of the fence assembly. Furthermore, the lower piece is fixed to the saw, while the upper piece requires additional mounting fasteners to attach the upper piece to the lower piece or the saw assembly. Again, moving the upper piece of the fence to perform a miter or bevel cut requires additional effort by the user and may require realignment of the fence.

What is needed, therefore, is a miter saw fence that can be positioned within 8 mm of the saw blade for straight cuts, but is movable relative to the saw blade so that the fence does not interfere with the saw blade during miter and bevel cuts. Additionally, a miter saw fence that does not require realignment before and/or after performing a miter or bevel cut would be advantageous.

SUMMARY

In one embodiment, a fence system for a miter saw includes a fence body, a fixed base, first and second bushings, and first, second, and third fasteners. The fence body has an abutment surface and defines a first slot having a first width, a second slot having a second width, and an aperture. The fixed base has a first bore, a second bore, and a third bore. The first bushing includes a first opening and has a first diameter that is substantially equal to the first width, and the first bushing extends through the first slot. The second bushing includes a second opening and a second diameter that is substantially equal to the second width, and the second bushing extends through the second slot. The first fastener extends through the first opening into the first bore and is configured to clamp the first bushing to the fixed base, the second fastener extends through the second opening into the second bore and is configured to clamp the second bushing to the fixed base, and the third fastener extends through the aperture into the third bore and is configured to releasably clamp the fence body to the fixed base.

In another embodiment, a miter saw assembly includes a miter saw, a support table, a fence body, first and second bushings, and first, second, and third fasteners. The miter saw has a motor configured to rotationally drive a saw blade. The support table is configured to support the miter saw and includes (i) a fixed base having a first bore, a second bore, and a third bore, (ii) a bevel mount configured to support the miter saw pivotably about a first horizontal axis, and (iii) a rotatable support configured to support the miter saw rotatably about a vertical axis. The fixed base and the rotatable support define a work surface normal to the vertical axis. The fence body includes an abutment surface orthogonal to the work surface and defines a first slot having a first width, a second slot having a second width, and an aperture. The first bushing includes a first opening and has a first diameter that is substantially equal to the first width, and the first bushing extends through the first slot. The second bushing includes a second opening and a second diameter that is substantially equal to the second width, and the second bushing extends through the second slot. The first fastener extends through the first opening into the first bore and is configured to clamp the first bushing to the fixed base. The second fastener extends through the second opening into the second bore and is configured to clamp the second bushing to the fixed base. The third fastener extends through the aperture into the third bore and is configured to releasably clamp the fence body to the fixed base.

In a further embodiment, a fence system for a miter saw includes a fence body, a fixed base, first and second bushings, and first and second fasteners. The fence body has an abutment surface and defines a first slot having a first width and a second slot having a second width. The fixed base has a first bore and a second bore. The first bushing includes a first opening and has a first diameter that is substantially equal to the first width, and the first bushing extends through the first slot. The second bushing includes a second opening, a cylindrical body, an outwardly extending flange, and a second diameter that is substantially equal to the second width, the second bushing extending through the second slot such that the cylindrical body is positioned within the slot and the outwardly extending flange is outside the second slot. The first fastener extends through the first opening into the first bore and is configured to clamp the first bushing to the fixed base, and the second fastener extends through the second opening into the second bore and is configured to clamp the second bushing to the fixed base. The cylindrical body of the second bushing is eccentric to the second opening and the outwardly extending flange such that rotation of the outwardly extending flange moves the second slot with respect to the second fastener in a direction parallel to the second width to adjust an alignment of the abutment surface.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
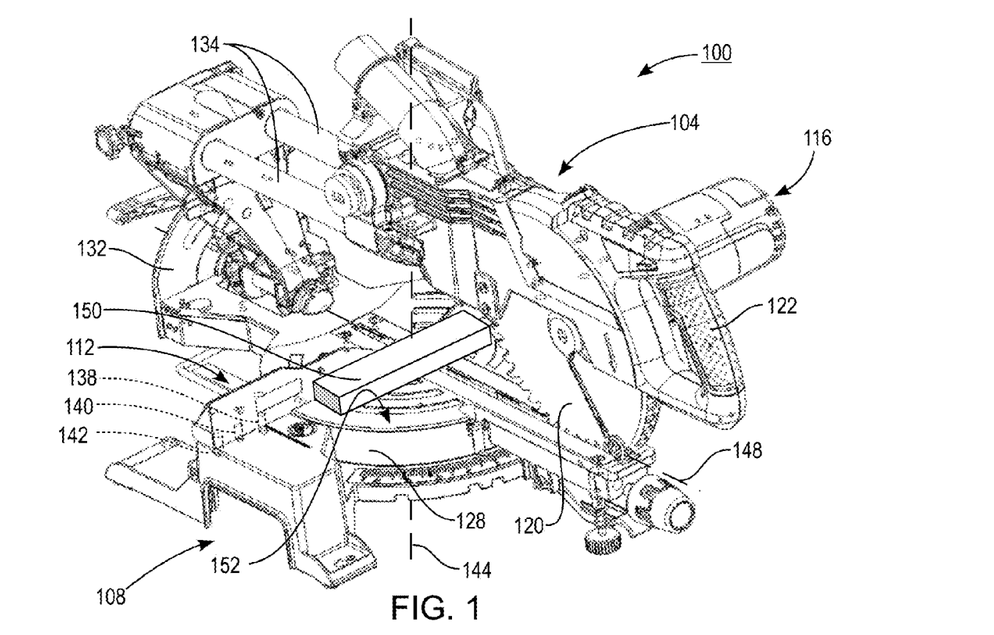
FIG. 1 is a front perspective view of a miter saw assembly having a fence system according to the disclosure.
Figure 2:
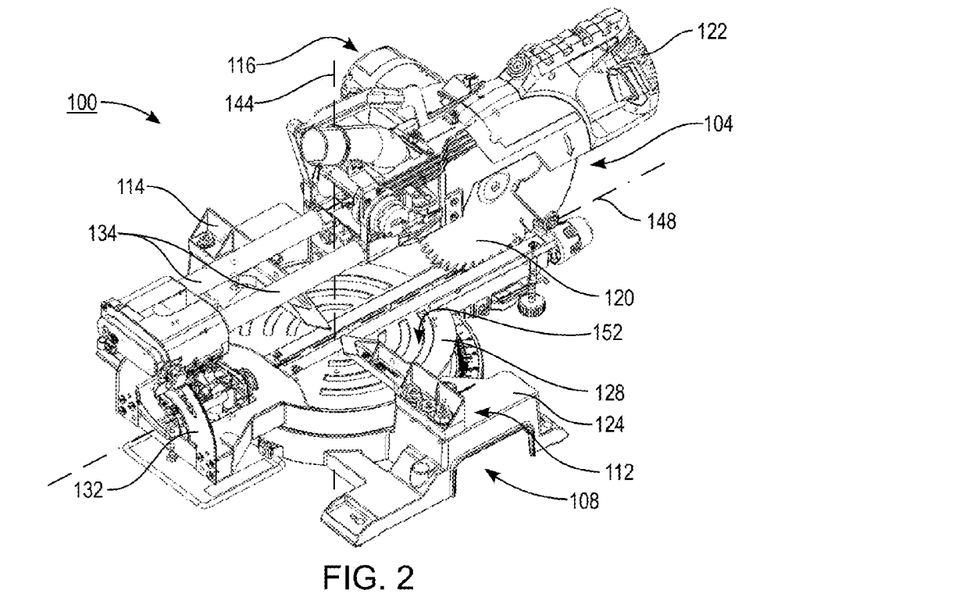
FIG. 2 is a rear perspective view of the miter saw assembly of FIG. 1 having the adjustable fence system according to the disclosure.
Figures 3, 3A:
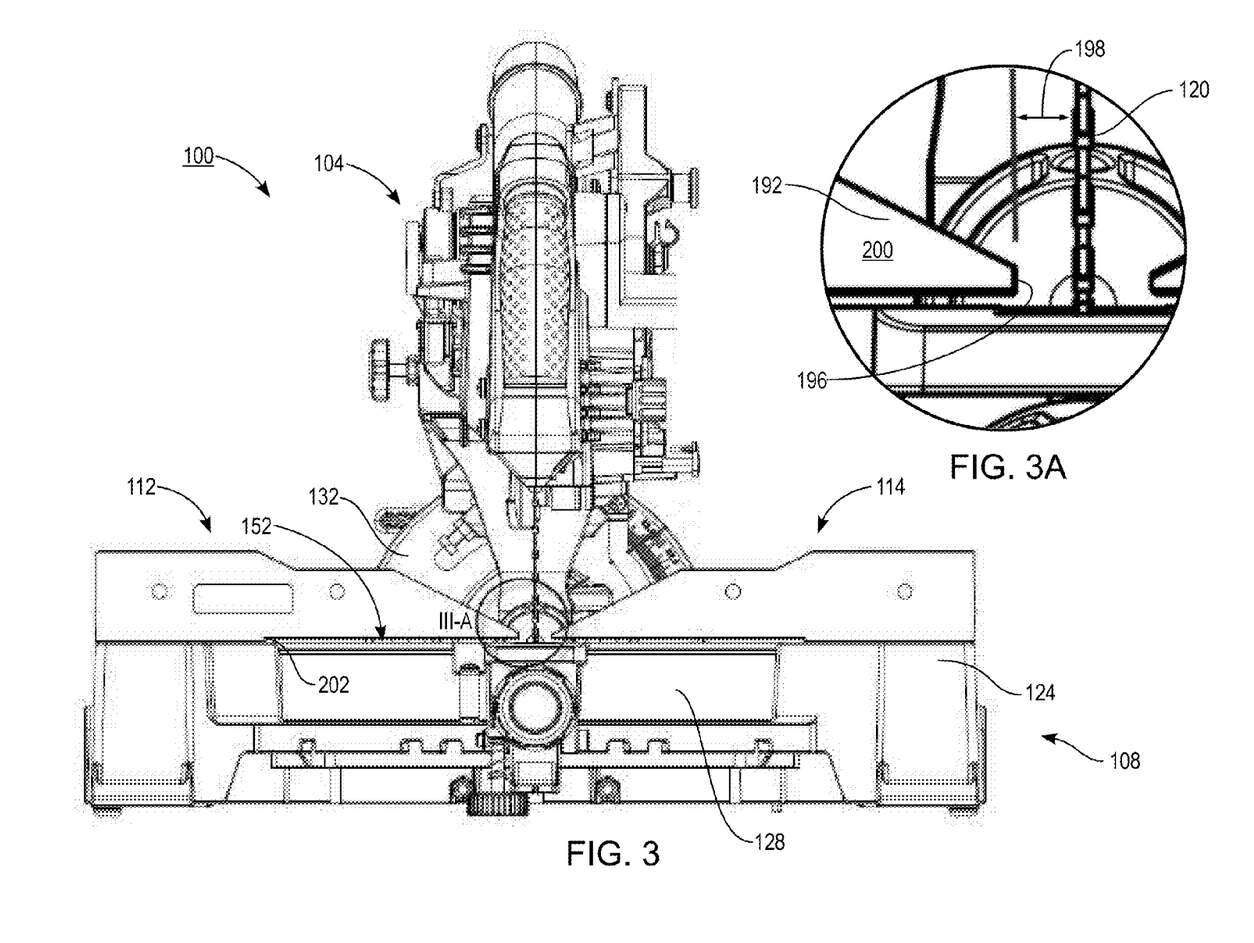
FIG. 3 is a front elevational view of the miter saw assembly of FIG. 1 having the adjustable fence system according to the disclosure.
FIG. 3A is a detail view of the saw blade and the angled end portion of the adjustable fence assembly of FIG. 3.

FIGS. 1-3 illustrate a miter saw assembly 100 having a miter saw 104, a support table 108, an adjustable fence system 112, and a fixed fence 114. In some embodiments, the miter saw assembly 100 may have two adjustable fence systems instead of one adjustable fence and one fixed fence. The miter saw 104 includes a motor assembly 116, a saw blade 120, and a handle 122. The motor assembly 116 is configured to rotationally drive the saw blade 120 to cut a workpiece 150.

The support table 108 has a fixed base 124, a rotatable support 128, a bevel mount 132, and two rails 134. The fixed base 124 supports the miter saw assembly 100 and is configured to be mounted to a table or other desired structure. Each side of the fixed base 124 includes three threaded bores 138, 140, 142, which, as discussed in detail below, are used to enable attachment of the fence system 112 to the fixed base 124.

The rotatable support 128 is rotatably attached to the fixed base 124, while the bevel mount 132 is pivotably supported by the rotatable support 128. The two rails 134 extend from the bevel mount 132, and the miter saw 104 is slidably mounted on the rails 134.

The rotatable support 128 is configured to rotate relative to the fixed base 124 about a vertical axis 144 extending centrally through the saw blade 120 to enable rotation of the saw blade 120 to execute a miter cut. The bevel mount 132 is connected to the rotatable support 128 such that rotation of the rotatable support 128 turns the bevel mount 132. The bevel mount 132 is pivotable relative to the rotatable support 128 about a horizontal axis 148 defined at the intersection of the saw blade 120 and the rotatable support 128 to enable the saw blade 120 to be angled relative to a workpiece 150 to perform a bevel cut. The upper surfaces of the fixed base 124 and the rotatable support 128 define a work surface 152 on which the workpiece 150 is supported during cutting.

Figure 4:
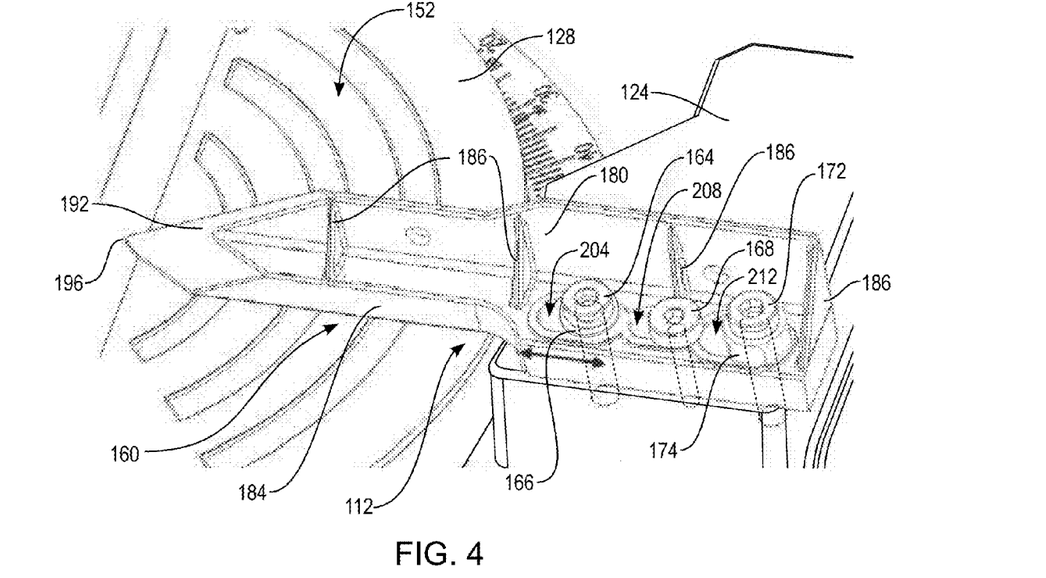
FIG. 4 is a rear perspective view of the adjustable fence system of the miter saw assembly of FIG. 1.
Figure 5:
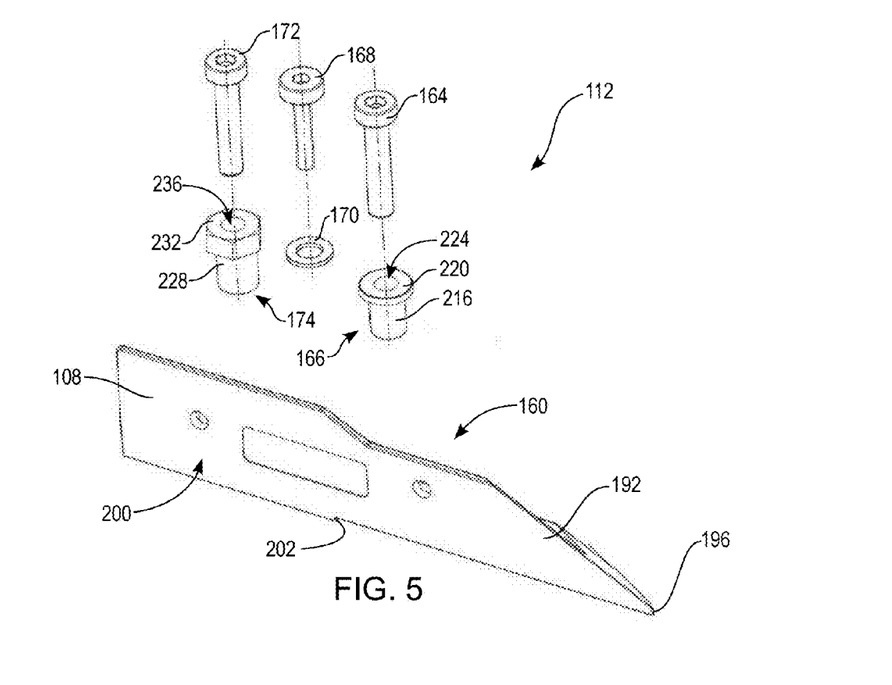
FIG. 5 is an exploded front view of the adjustable fence system of the miter saw assembly of FIG. 1.

With reference to FIGS. 4 and 5 and continuing reference to FIGS. 1-3, the adjustable fence system 112 for the miter saw assembly 100 includes a fence body 160, a first fastener 164 associated with a concentric bushing 166, a second fastener 168 associated with a washer 170, and a third fastener 172 associated with an eccentric bushing 174. The fence body 160 has a support member 180 and a base member 184. A plurality of triangular support braces 186 connects the upper portion of the support member 180 to the rear portion of the base member 184 to provide additional support for the support member 180. In the illustrated embodiment, the support member 180 and the base member 184 are elongated bodies positioned perpendicularly to one another. In other embodiments, depending on the configuration of the miter saw to which the fence system is attached, the base member may be generally parallel to the support member to facilitate connection to a vertical plate at the rear of the miter saw.

The support member 180 and the base member 184 taper at an angled end portion 192 to an edge 196, which, as shown in FIG. 3A, is positioned with a minimal clearance 198 relative to the saw blade 120. In one embodiment, the clearance 198 is less than 8 millimeters. The angled end portion 192 enables the saw blade to be rotated about the horizontal axis 148 to perform a bevel cut or to be rotated about the vertical axis 144 to perform a miter cut with interference only when a miter or bevel cut is performed at a large angle, for example an angle of greater than 30 degrees.

The support member 180 has a flat vertical abutment surface 200 that is orthogonal to the work surface 152 and normal to the horizontal cutting axis 148. The flat vertical surface 200 is configured to provide horizontal support to the workpiece 150 during cutting so that the workpiece 150 cannot move horizontally in a direction parallel to the cutting axis 148 while being cut. The support member 180 also includes a notch 202 such that the lower surface of the fence body 160 has a clearance from the rotatable support 128 such that the fence body 160 does not interfere with rotation of the rotatable support 128.

Three slots 204, 208, 212 are defined in the base portion 184 of the fence body 160. Each of the slots 204, 208, 212 is elongated in a direction parallel to the abutment surface 200. The outside slots 204, 212 receive the concentric and eccentric bushings 166, 174, respectively, while the middle slot 208 is configured to receive the second fastener 168.

The concentric bushing 166 has a cylindrical body 216 with an outwardly extending flange 220 at an upper end of the cylindrical body 216. An opening 224, which receives the first fastener 164, is defined concentrically through the cylindrical body 216 and the flange 220. The cylindrical body 216 has a diameter that is substantially equal to a width of the first slot 204, defined in a direction parallel to the horizontal cutting axis 148, such that the cylindrical body 216 fits within the first slot 204 and is constrained from moving in the direction parallel to the horizontal cutting axis 148. The slot 204, however, is movable with respect to the concentric bushing 166 in the long direction of the slot 204. The cylindrical body 216 of the bushing 166 has a length that is slightly greater than a width of the base 184 of the fence body 160 such that the bushing 166 may be clamped to the fixed base 124 of the support table 108 by the fastener 164 without clamping the fence body 160 to the base 124.

The eccentric bushing 174 has a cylindrical body 228 with a hexagonal outwardly extending flange 232 at an upper end of the cylindrical body 228 that is eccentric to the cylindrical body 228. The eccentricity is seen in the view of FIG. 4, as the cylindrical body 228 is tangent to the upper right edge of the flange 232 and spaced apart from the lower left edge of the flange 232. An opening 236, which receives the third fastener 172, extends through the center of the flange 232, offset from a central axis of the cylindrical body 228. The diameter of the cylindrical body 228 is substantially equal to a width of the third slot 212 in a direction parallel to the horizontal cutting axis 148 such that the cylindrical body 216 fits within the first slot 204 and is constrained from moving in the direction parallel to the horizontal cutting axis 148. The slot 212 is movable with respect to the eccentric bushing 174 in the long direction of the slot 212. The cylindrical body 228 of the bushing 174 has a length that is slightly greater than a width of the base 184 of the fence body 160 such that the bushing 174 may be clamped to the fixed base 124 of the support table 108 by the fastener 172 without clamping the fence body 160 to the base 124.

To attach the fence system 112 to the fixed base 124 of the miter saw assembly 100, the first and third fasteners 164, 172 are inserted through the openings 224, 236 of the concentric and eccentric bushings 166, 174, respectively. The cylindrical portions 216, 228 of the bushings 166, 174, respectively, are then inserted into the outer slots 204, 212, in the fence body 160 and the fasteners 164, 172 are inserted through the openings 224, 236 into the threaded bores 138, 142, respectively. The fasteners 164, 172 loosely clamp the bushings 166, 172 to the fixed base 124. The eccentric bushing 174 is configured such that rotation of the eccentric bushing 174 changes the position of the third fastener 172 with respect to the first fastener 164 to adjust the alignment of the abutment surface 200. The hexagonal flange 232 is adapted to be turned by a wrench so that the eccentric bushing 174 may be rotated for very fine adjustment of the fence body 160 when the bushing 174 is loosely clamped to the fixed base 124. The fence body 160 can thus be positioned such that the abutment surface 200 of the fence body 160 is perfectly perpendicular to the saw blade 120 when the saw is configured for a straight cut, i.e. a cut with zero bevel or miter. Once the fence body 160 is aligned, the first and third fasteners 164, 172 are securely tightened into the first and third threaded bores 138, 142 in the fixed base 124 to fixedly clamp the bushings 166, 174 to the saw base 124. At this point, the fence body 160 is fixed against movement in the direction parallel to the cutting axis 148 and prevented from rotating by the tight fit of the bushings 166, 174 in the slots 204, 212, respectively. In one embodiment, the fence body 160 is aligned with respect to the saw blade and the work surface 152 during factory assembly, such that a user need not perform an alignment of the abutment surface 200.

The fence body 160, however, is still movable in the horizontal direction perpendicular to the cutting axis 148, as movement of the fence body 160 slides the slots 204, 212 relative to the bushings 166, 174. The user positions the fence body 160 relative to the saw blade 120 and, once the fence body 160 is in the desired position, the user inserts the second fastener 168 through the washer 170 and the middle slot 208 into the second threaded bore 140 in the fixed base 124 of the support table 108. The second fastener 168 is tightened until the head of the fastener 168 and the washer 170 clamp the base portion 184 of the fence body 160 securely against the fixed base 124 of the support table 108. The fence body 160 is then constrained from any movement relative to the fixed base 124.

For a straight cut, the fence body 160 is positioned as shown in FIGS. 3 and 3A such that the clearance 198 between the saw blade 120 and the edge 196 of the fence body 160 is minimal to comply with the industry standards for a straight cut. At this position, the bushings 166, 174 and fasteners 164, 168, 172 are at the end of their respective slots 204, 208, 212 farthest from the edge 196 of the fence body 160, as illustrated in FIG. 4.

Figures 6, 6A:
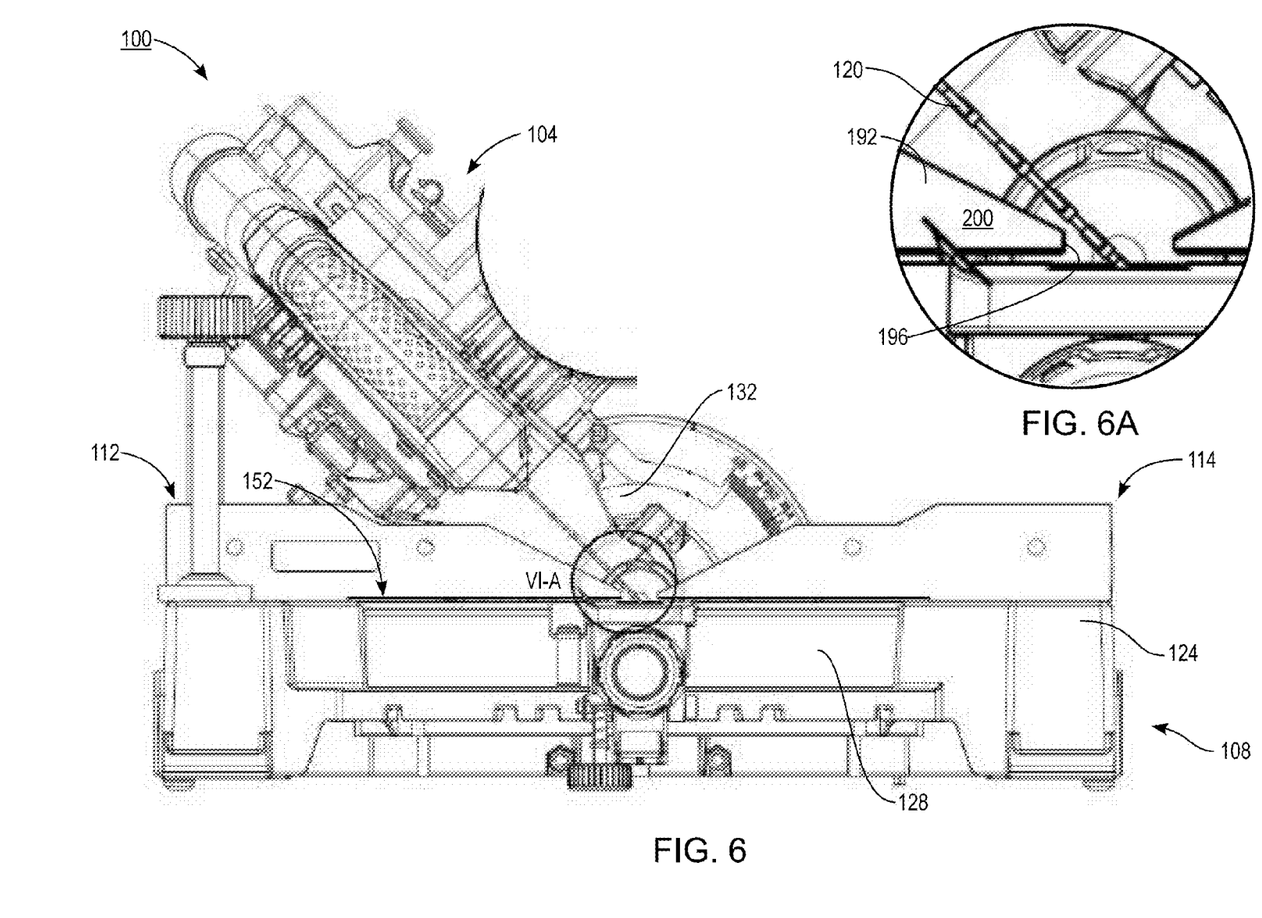
FIG. 6 is a front elevational view of the miter saw assembly of FIG. 1 having the adjustable fence system according to the disclosure, wherein the saw is configured for a bevel cut.
FIG. 6A is a detail view of the saw blade and the angled end portion of the adjustable fence assembly of FIG. 6.

When the saw blade 120 is rotated for a bevel or miter cut, the saw blade 120 moves closer to the edge 196 of the fence body 160. For cuts performed with a large bevel or miter, for example the bevel cut illustrated in FIGS. 6 and 6A, the clearance between the saw blade 120 and the edge 196 of the fence body 112 is reduced to a point at which the fence body 160 may interfere with the saw blade 120 during the cut. In order to avoid damage to the fence body 160 or the saw blade 120, the user must move the fence body 160 away from the saw blade 120. The user loosens the second fastener 168, enabling the fence body 160 to move horizontally away from the saw blade 120. The user then slides the fence body 160 to the right in the view of FIG. 4 to a position at which the edge 196 of the fence body 160 will not interfere with the saw blade 120. The second fastener 168 is tightened to clamp the fence body 160 against the fixed base 124, and the bevel cut can be executed.

Since the bushings 166, 174 enable the fence body 160 to move only in the horizontal direction when the position of the fence body 160 is adjusted, the fence body 160 need not be aligned each time the fence is moved. Thus, the accuracy of the cut is improved and a user may alternate between a straight cut and a mitered or beveled cut quickly and easily without need to realign the fence body 160. Furthermore, since the fence body 160 is formed of a single piece, the fence system 112 can be manufactured more economically and with fewer parts than a fence system with a two piece fence body.

In the illustrated embodiment, the fasteners 164, 168, 172 are threaded bolts. In other embodiments, alternative fasteners may be used for one of more of the fasteners, particularly the second fastener 168. For example, the second fastener may be replaced with a spring loaded pin or a fastener with an easy grip feature such as a knob to facilitate simple adjustment of the fence body 160.

Although the fence body 160 of the embodiment illustrated includes three slots 204, 208, 212, in some embodiments the second slot 208 may be replaced with a circular aperture, and the fixed base 124 of the saw support 108 may include two or more threaded bores in which the second fastener 168 can be threaded or otherwise clamped into. In such an embodiment, one of the threaded bores is positioned such that the second fastener inserts into the bore at the nearest position of the fence body to the saw blade, and one or more additional threaded bores are positioned at intervals such that the fence body is spaced further from the saw blade when the second fastener is clamped into the one or more additional threaded bores.

The reader should appreciate that the order of the slots and bushings may be interchanged in different embodiments. For example, the eccentric bushing may be inserted in the slot nearest to the saw blade or in the middle slot. The slot through which the second fastener extends to clamp the fence body to the fixed base may be the nearest or the farthest slot from the saw blade. Likewise, the slot with the concentric bushing may be positioned between the other two slots or may be located farthest from the saw blade.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

What is claimed is:

1. A fence system for a miter saw assembly having a fixed base, comprising: a fence body including an abutment surface and defining a first slot having a first width, a second slot having a second width, and an aperture; the fixed base including a first bore, a second bore, and a third bore;
   a first bushing including a first opening and having a first diameter that is substantially equal to the first width, the first bushing extending through the first slot;
   a second bushing including a second opening and a second diameter that is substantially equal to the second width, the second bushing extending through the second slot;
   a first fastener extending through the first opening into the first bore and configured to clamp the first bushing to the fixed base;
   a second fastener extending through the second opening into the second bore and configured to clamp the second bushing to the fixed base; and
   a third fastener extending through the aperture in the fence body into the third bore, the third fastener being configured to releasably clamp the fence body to the fixed base.

2. The fence system of claim 1, wherein the aperture in the fence body defines a third slot.

3. The fence system of claim 2, wherein:
   the first slot defines a first longitudinal axis, the second slot defines a second longitudinal axis, and the third slot defines a third longitudinal axis, and
   the first, second, and third longitudinal axes are parallel to a plane defined by the abutment surface of the fence body.

4. The fence system of claim 1, wherein:
   the first bushing includes a first cylindrical body and a first outwardly extending flange outside the first slot; and
   the second bushing includes a second cylindrical body and a second outwardly extending flange outside the second slot.

5. The fence system of claim 4, wherein the second cylindrical body is eccentric with respect to the second opening and the second outwardly extending flange such that rotation of the second outwardly extending flange moves the slot with respect to the second fastener in a direction parallel to the second width to adjust an alignment of the abutment surface.

6. The fence system of claim 5, wherein the second outwardly extending flange is generally hexagonally shaped.

7. The fence system of claim 1, wherein:
   the fence body includes an elongated base portion and an elongated support portion, which are perpendicular with respect to one another;
   the elongated support portion includes the abutment surface; and
   the first and second slots and the aperture are defined in the elongated base portion.

8. The fence system of claim 7, wherein a first end of the elongated support portion tapers to an edge having a reduced height.

9. The fence system of claim 1, wherein the aperture in the fence body is interposed between the first slot and the second slot.

10. The fence system of claim 1, wherein the first slot, second slot, and aperture are positionally fixed relative to one another.

11. A miter saw assembly, comprising:
    a miter saw having a motor configured to rotationally drive a saw blade;
    a support table configured to support the miter saw and including (i) a fixed base having a first bore, a second bore, and a third bore, (ii) a bevel mount configured to support the miter saw pivotably about a first horizontal axis, and (iii) a rotatable support configured to support the miter saw rotatably about a vertical axis, the fixed base and the rotatable support defining a work surface normal to the vertical axis;
    a fence body including an abutment surface orthogonal to the work surface and defining a first slot having a first width, a second slot having a second width, and an aperture;
    a first bushing including a first opening and a first diameter that is substantially equal to the first width, the first bushing extending through the first slot;
    a second bushing including a second opening and a second diameter that is substantially equal to the second width, the second bushing extending through the second slot;
    a first fastener extending through the first opening into the first bore and configured to clamp the first bushing to the fixed base;
    a second fastener extending through the second opening into the second bore and configured to clamp the second bushing to the fixed base; and
    a third fastener extending through the aperture into the third bore, the third fastener being configured to releasably clamp the fence body to the fixed base.

12. The miter saw assembly of claim 11, wherein the aperture in the fence body defines a third slot.

13. The miter saw assembly of claim 12, wherein:
    the first slot defines a first longitudinal axis, the second slot defines a second longitudinal axis, and the third slot defines a third longitudinal axis, and
    the first, second, and third longitudinal axes are parallel to a plane defined by the support surface of the flange body and orthogonal to the first horizontal axis and the vertical axis.

14. The miter saw assembly of claim 11, wherein:
    the first bushing includes a first cylindrical body and a first outwardly extending flange outside the first slot; and the second bushing includes a second cylindrical body and a second outwardly extending flange outside the second slot.

15. The miter saw assembly of claim 14, wherein the second cylindrical body is eccentric with respect to the second opening and the second outwardly extending flange such that rotation of the second outwardly extending flange moves the second slot with respect to the second fastener in a direction parallel to the first horizontal axis to adjust an alignment of the abutment surface.

16. The miter saw assembly of claim 15, wherein the second outwardly extending flange is generally hexagonally shaped.

17. The miter saw assembly of claim 11, wherein:
the fence body includes an elongated base portion and an elongated support portion, which are perpendicular with respect to one another;
the elongated support portion includes the abutment surface; and
the first and second slots and the aperture are defined in the elongated base portion.

18. The miter saw assembly of claim 17, wherein a first end of the elongated support portion tapers to an edge having a reduced height.

19. The miter saw assembly of claim 11, wherein the aperture in the fence body is interposed between the first slot and the second slot.

20. A fence system for a miter saw assembly having a fixed base, comprising: a fence body including an abutment surface and defining a first slot having a first width and a second slot having a second width; the fixed base including a first bore and a second bore;
a first bushing including a first opening and having a first diameter that is substantially equal to the first width, the first bushing extending through the first slot;
a second bushing including a second opening, a cylindrical body, an outwardly extending flange, and a second diameter that is substantially equal to the second width, the second bushing extending through the second slot such that the cylindrical body is positioned within the second slot and the outwardly extending flange is outside the second slot;
a first fastener extending through the first opening into the first bore and configured to clamp the first bushing to the fixed base; and
a second fastener extending through the second opening into the second bore and configured to clamp the second bushing to the fixed base,
wherein the cylindrical body is eccentric to the second opening and the outwardly extending flange such that rotation of the outwardly extending flange moves the second slot with respect to the second fastener in a direction parallel to the second width to adjust an alignment of the abutment surface.

* * * * *